United States Patent [19]
Lee et al.

[11] Patent Number: 5,428,397
[45] Date of Patent: Jun. 27, 1995

[54] VIDEO FORMAT CONVERSION APPARATUS FOR CONVERTING INTERLACED VIDEO FORMAT INTO PROGRESSIVE VIDEO FORMAT USING MOTION-COMPENSATION

[75] Inventors: Dong H. Lee; Seung I. Kim, both of Seoul, Rep. of Korea

[73] Assignee: Goldstar Co., Ltd., Seoul, Rep. of Korea

[21] Appl. No.: 238,322

[22] Filed: May 5, 1994

[30] Foreign Application Priority Data

| May 7, 1993 | [KR] | Rep. of Korea | 1993-7870 |
| Jun. 4, 1993 | [KR] | Rep. of Korea | 1993-10115 |
| Aug. 7, 1993 | [KR] | Rep. of Korea | 1993-15431 |
| Aug. 18, 1993 | [KR] | Rep. of Korea | 1993-16033 |

[51] Int. Cl.$^6$ .............................................. H04N 7/01
[52] U.S. Cl. ............................... 348/448; 348/452; 348/459
[58] Field of Search ............... 348/452, 459, 448, 443, 348/441; H04N 7/01

[56] References Cited

U.S. PATENT DOCUMENTS

| 4,967,271 | 10/1990 | Campbell et al. | 348/452 |
| 4,972,259 | 11/1990 | Motoe et al. | 348/700 |
| 4,984,077 | 1/1991 | Uchida | 348/700 |
| 5,005,078 | 4/1991 | Gillard | |
| 5,051,826 | 9/1991 | Ishii et al. | 348/700 |
| 5,093,720 | 3/1992 | Krause et al. | 348/452 |
| 5,095,354 | 3/1992 | Sokawa et al. | |
| 5,249,037 | 9/1993 | Sugiyama et al. | 348/452 |

*Primary Examiner*—Victor R. Kostak
*Attorney, Agent, or Firm*—Finnegan, Henderson Farabow, Garrett & Dunner

[57] ABSTRACT

Video format conversion apparatus and method for a high-definition TV capable of achieving motion compensation by macroblocks, determining stationary condition, motion-involved condition and scene change by pixels, and achieving interpolation by pixels, thereby accurately realizing conversion of a video of the interlaced scanning format into a video of the progressive scanning format. The video formation conversion is achieved by substituting the value of the current pixel by the mean of the values of reference pixels, positioned at the same position as the current pixel, respectively in a previous field and a next field when the current pixel is a stationary pixel, interpolating the current pixel through a motion compensation when the current pixel is a motion-involved pixel, determining whether a displaced frame difference is less than a predetermined threshold value when the current pixel is neither of the stationary one or the motion-involved one, substituting the current pixel value with the mean value of the reference pixel values in the previous and next fields when the displaced frame difference is less than the threshold value, and substituting the current pixel value by use of intra-field pixel values when the displaced frame difference is not less than the threshold value.

15 Claims, 3 Drawing Sheets

VIDEO FORMAT CONVERSION APPARATUS FOR CONVERTING INTERLACED VIDEO FORMAT INTO PROGRESSIVE VIDEO FORMAT USING MOTION-COMPENSATION

BACKGROUND OF THE INVENTION

The present invention relates to video format conversion apparatus and method for a television (TV), and more particularly to video format conversion apparatus and method for a TV for converting an interlaced video format into a progressive video format.

High definition TVs (HDTVs) of the interlaced scanning system developed in Japan are currently used experimentally on the air. These HDTV's can easily use a video source because their peripheral appliances such as cameras and video cassette recorders have already been developed. With progressive scanning HDTV systems developed in the U.S.A., it is difficult to utilize a video source of the progressive scanning system because no peripheral appliances have been developed. In the latter case, therefore, video of the interlaced scanning format must be converted into a video of the progressive scanning format. In particular, the format of videos displayed on a monitor should be of the progressive scanning system. For transmitting compressed videos of the interlaced scanning format, accordingly, it is important and essential to efficiently convert them into the progressive scanning format as a display format.

In conventional analog systems, pixel (line) interpolation for NTSC TV or digital TV is carried out using one oil the following methods:

First, the intra-field interpolation that involves to interpolating lines not scanned using scanned lines in the current field. Although this method is the most simple, there is a problem of a deterioration in resolution because each line is interpolated by the mean value of pixels on scanned upper and lower lines positioned with respect to the line to be interpolated.

Second, the inter-field interpolation that involves simply interpolating lines not scanned using scanned lines of the current field and other fields, without any motion compensation. Although this method recovers videos with high resolution for stationary video portions, there is a problem of a severe artifact for motion-involved video portions.

Third, the interpolation with motion compensation can be used. This method solves the problems encountered in the intra-field interpolation method and the inter-field interpolation method.

In accordance with the interpolation method involving the motion compensation, motion information is searched. Based on the searched motion information, a video scene is divided into a stationary video portion and a motion video portion which will be adaptively interpolated.

For example, the stationary video portion is substituted by the mean value of two successive frames while the motion video portion is subjected to a motion compensation. For a scene change, the intra-field interpolation is adopted so as to maximize the efficiency.

Now, a general method of converting a video of the interlaced scanning format into a video of the progressive scanning format using the interpolation with motion compensation in a digital HDTV will be described.

In this case, reference frames are needed for the motion compensation. In accordance with techniques recently proposed, two frames t−1 and t+1 respectively just preceding and just following the current frame t are used as reference frames. For these reference frames, motion-compensated videos are used in order to achieve an as accurate an interpolation as possible. For the previous frame t−1, in particular, videos already converted into those of the progressive scanning format are used so that they can be time-recursive. For the next frame, lines not scanned are substituted by the mean value of optional upper and lower scanned lines.

In order to seek a motion, motion compensation is carried out using identical motion information by equal sized blocks each including, for example, 16 by 8 pixels in accordance with the block matching algorithm.

In this case, first, the current frame to be interpolated is divided into equal sized blocks each including, for example, 16×8 pixels. For the current block to be interpolated, motion information is sought from the previous frame and the next frame.

Since lines in half of each block to be interpolated are those not scanned, lines being used for seeking motion information correspond to those in the remaining half scanned.

Using the motion information sought as mentioned above, lines not scanned are interpolated. As useful methods for such an interpolation, there are: a method utilizing a compensation based on the previous frame, a method utilizing a compensation based on the next frame, and a method utilizing a substitution by the mean value of signals compensated from the previous frame and the next frame. Among these methods, one yielding the minimum error is selectively used.

SUMMARY OF THE INVENTION

Therefore, an object of the invention is to provide a video format conversion apparatus and method for an HDTV capable of achieving motion compensation by macroblocks, determining stationary condition, motion-involved condition and scene change by pixels, and achieving interpolation by pixels, thereby accurately realizing conversion of a video of the interlaced scanning format into a video of the progressive scanning format.

In accordance with one aspect, the present invention provides a video format conversion apparatus comprising: motion compensating means for performing a motion compensation using a variable length-decoded and demultiplexed signal and a dequantized and inverse discrete cosine transformed signal; field storing means for storing therein a video signal outputted from the motion compensating means and sending the stored video signal to the motion compensating means; format conversion controlling means for controlling a format conversion using the variable length-decoded and demultiplexed signal, the dequantized and inverse discrete cosine transformed signal and the video signal stored in the field storing means; first slice buffer means for converting a control signal for each macroblock outputted from the format conversion controlling means into one for each pixel; second slice buffer means for converting the variable length-decoded and demultiplexed signal for each macroblock into one for each pixel; and interpolating means for performing an interpolation using the video signal from the motion compensating means in accordance with output signals from the first and second slice buffer means.

In accordance with another aspect, the present invention provides a video format conversion method comprising: a stationary condition determination and interpolation step of determining whether a current pixel to be interpolated is a stationary one, and substituting the value of the current pixel by the mean of the values of reference pixels, positioned at the same position as the current pixel, respectively in a previous field preceding a current field including the current pixel and a next field following the current field when the current pixel is the stationary one; a motion-involved condition determination and interpolation step of determining whether the current pixel is a motion-involved one, and interpolating the current pixel through a motion compensation when the current pixel is the motion-involved one; a displaced frame difference determination step of determining whether a displaced frame difference is less than a predetermined threshold value when the current pixel is neither of the stationary one or the motion-involved one; an inter-field interpolation step of substituting the current pixel value by the mean of the reference pixel values in the previous and next fields when the displaced frame difference is less than the predetermined threshold value; and an intra-field interpolation step of substituting the current pixel value by use of intra-field pixel values when the displaced frame difference is not less than the predetermined threshold value.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
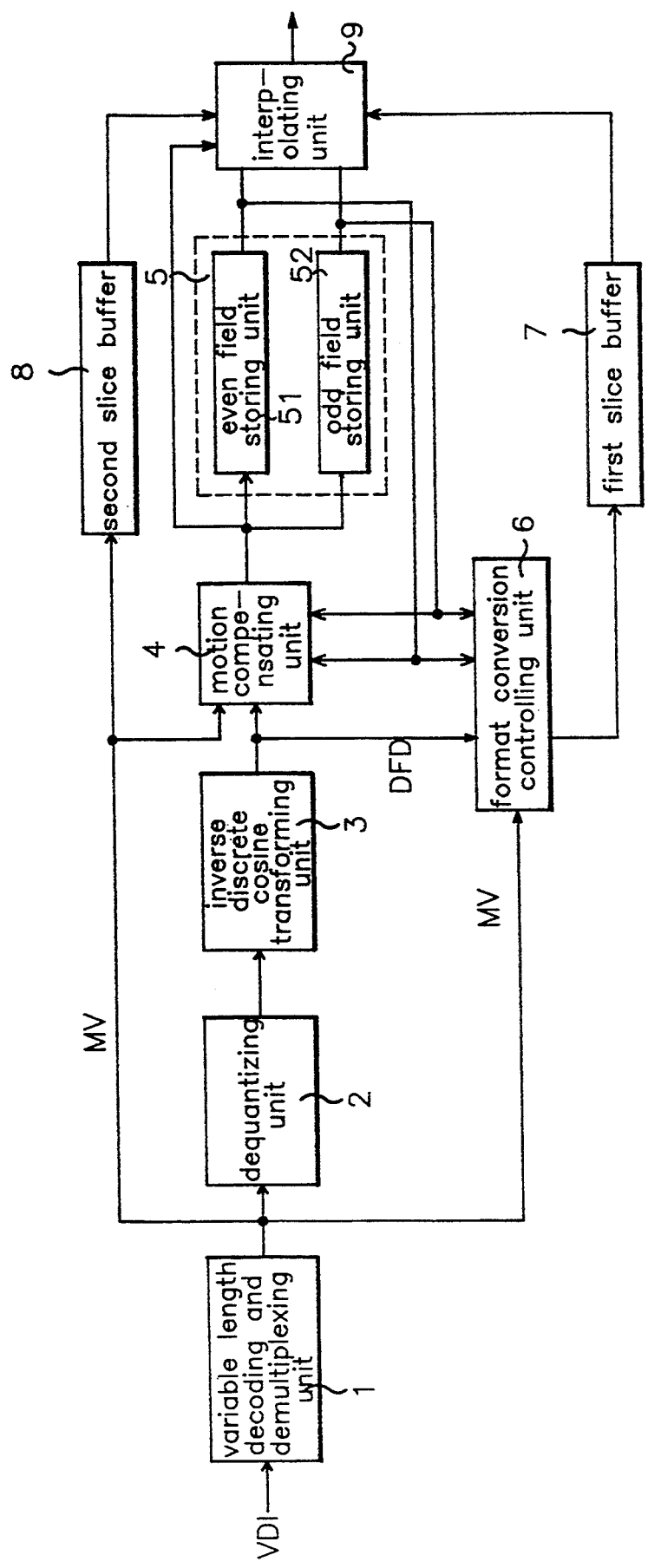
FIG. 1 is a block diagram of a video format conversion apparatus in accordance with the present invention.

Referring to FIG. 1, there is illustrated a video format conversion apparatus in accordance with the present invention. As shown in FIG. 1, this video format conversion apparatus comprises a variable length decoding and demultiplexing unit 1, a dequantizing unit 2, an inverse discrete cosine transforming unit 3, a motion compensating unit 4, a field storing unit 5, a format conversion controlling unit 6, slice buffers 7 and 8, and an interpolating unit 9.

The variable length decoding and demultiplexing unit 1 variable length-decodes and demultiplexes input data Vdi of the interlaced scanning format transmitted from an encoder so that the input data Vdi is separated into quantization coefficients, motion vectors MV, and control parameters.

The dequantizing unit 2 performs a dequantization in accordance with dequantization coefficients obtained from the variable length decoding and demultiplexing unit 1. The inverse discrete cosine transforming unit 3 performs an inverse discrete cosine transform for dequantized signals received from the dequantizing unit 2, thereby recovering displaced frame differences in accordance with an estimation of motions of videos.

The motion compensating unit 4 performs a motion compensation using: the motion vectors MV from the variable length decoding and demultiplexing unit 1 resulting from the variable length decoding and demultiplexing; the displaced frame differences from the inverse discrete cosine transforming unit 3 resulting from the variable length decoding, demultiplexing, dequantization and inverse discrete cosine transform; and video signals of the previous field stored in the field storing unit 5. After the motion compensation, the motion compensating unit 4 outputs motion-compensated video signals by frames.

That is, the motion compensating unit 4 shifts video signals of the previous field stored in the field storing unit 5 in accordance with the motion vectors MV outputted from the variable length decoding and demultiplexing unit 1, thereby achieving the motion compensation. The resultant signals are then added respectively to corresponding video signals outputted from the inverse discrete cosine transforming unit 3, so that the motion compensating unit 4 outputs motion-compensated video signals by frames.

The field storing unit 5 comprises an even field storing circuit 51 and an odd field storing circuit 52 so as to store the motion-compensated video signals received from the motion compensating unit 4 by frames.

The format conversion controlling unit 6 controls a format conversion using: the motion vectors MV resulting from the variable length decoding and demultiplexing and outputted by macroblocks from the variable length decoding and demultiplexing unit 1; the displaced frame differences resulting from the variable length decoding, demultiplexing, dequantization and inverse discrete cosine transform and outputted by macroblocks from the inverse discrete cosine transforming unit 3; and the video signals of the previous field stored in the field storing unit 5.

That is, the format conversion controlling unit 6 determines stationary condition, motion-involved condition and scene change, by pixels, using the motion vectors MV, the displaced frame difference signals from the inverse discrete cosine transforming unit 4, and the video signals of the previous field stored in the field storing unit 5. Based on the result of the determination, the format conversion controlling unit 6 controls the interpolating unit 9 through the slice buffer 7.

The slice buffer 7 collects control signals outputted by macroblocks from the format conversion controlling unit 6, by slices. Then the slice buffer 7 outputs the resultant signals to the interpolating unit 9 by pixels.

On the other hand, the slice buffer 8 collects the motion vectors MV outputted by macroblocks from the variable length decoding and demultiplexing unit 1, by slices. Then the slice buffer 8 outputs the resultant signals to the interpolating unit 9 by pixels.

The interpolating unit 9 performs an inter-field interpolation, an intra-field interpolation, an interpolation utilizing a motion compensation, and an interpolation utilizing median filters so as to convert video signals of the interlaced scanning format into video signals of the progressive scanning format.

Figure 2:
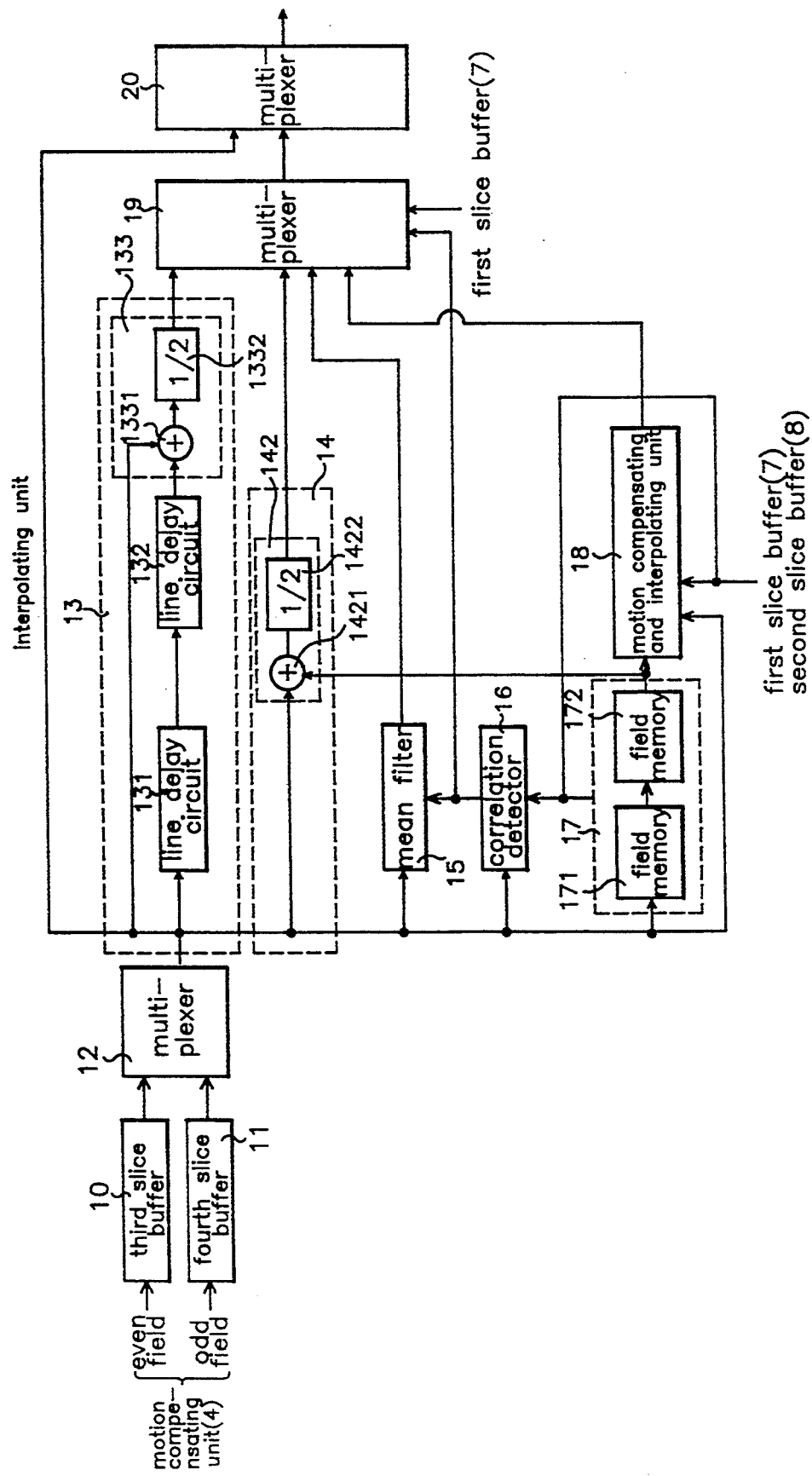
FIG. 2 is a block diagram of an interpolating unit constituting a part of the apparatus of FIG. 1 in accordance with the present invention.

As shown in FIG. 2, the interpolating unit 9 comprises slice buffers 10 and 11, multiplexers 12, 19 and 20, an intra-field interpolating circuit 13, an inter-field interpolating circuit 14, a mean filter 15, a correlation detector 16, a field storing circuit 17 and a motion compensating and interpolating circuit 18. The slice buffer 10 receives video signals of even fields stored in the field storing unit 51 by slices, and converts them by lines. The slice buffer 11 receives video signals of odd fields stored in the field storing unit 52 by slices, and converts them by lines. The multiplexer 12 multiplexes video signals outputted by lines from the slice buffers 10 and 11 in a sequential manner. The intra-field interpolating circuit 13 includes two line delay circuits 131 and 132 and a mean calculating circuit 133 connected with the line delay circuits 131 and 132 in series. With such a construction, the intra-field interpolating circuit 13 substitutes a value of a pixel to be interpolated, namely, the current pixel value by a mean line value using a video signal outputted from the multiplexer 12. The line delay circuit 131 delays video signals outputted from the multiplexer 12 by lines while the line delay circuit 132 delays video signals outputted from the line delay circuit 131 by lines. The mean calculating circuit 133 includes an adder 1331 coupled to both the multiplexer 12 and the line delay circuit 132, and an ½ multiplier 1332 coupled to the adder 1331. With such a construction, the mean calculating circuit 133 calculates a mean value of video signals outputted from the multiplexer 12 and the line delay circuit 132.

The inter-field interpolating circuit 14 comprises a mean calculating circuit 142 which serves to substitute a pixel to be interpolated by a mean line value using a video signal outputted from the multiplexer 12 and a video signal outputted from a field memory 172.

The mean calculating circuit 142 includes an adder 1421 coupled to both the multiplexer 12 and the field memory 172, and an ½ multiplier 1422 coupled to the adder 1421. With such a construction, the mean calculating circuit 142 calculates a mean value of video signals outputted from the multiplexer 12 and the field memory 172.

The correlation detector 16 detects the correlation between the pixel to be interpolated and peripheral pixels in the same field using a video signal from the multiplexer 12 in accordance with a control signal from the slice buffer 7 and thereby controls the mean filter 15 and the multiplexer 19.

That is, the correlation detector 16 calculates the following ratios a to d: "a" the ratio of the sum of values of upper and lower first pixels vertically adjacent to the current pixel to be interpolated to the difference therebetween; "b" the ratio of the sum of values of pixels adjacent to the current pixel in one diagonal direction to the difference therebetween; "c" the ratio of the sum of values of pixels adjacent to the current pixel in the other diagonal direction to the difference therebetween; and "d" the ratio of the sum of values of upper and lower third pixels adjacent to the difference therebetween: wherein $$a=(X(i,j-1,t)+X(i,j+1,t))/|X(i,j-1,t)-X(i,j+1,t)|$$

$$b=(X(i-1,j-1,t)+X(i+1,j+1,t))/|X(i-1,j-1,t)+X(i+1,j+1,t)|$$

$$c=(X(i+1,j-1,t)+X(i-1,j+1,t))/|X(i+1,j-1,t)+X(i-1,j+1,t)|$$

$$d=(X(i,j-3,t)+X(i,j+3,t))/|X(i,j-3,t)+X(i,j+3,t)|$$

$$T7=\mathrm{MIN}(a,b,c,d)$$

As a result of the calculation, the minimum value of the ratios a to d is determined as a correlation value T7. Where the correlation value T7 is less than the threshold value Th8 (T7<Th8), the mean filter 15 is operated. If not, the multiplexer 19 is controlled to select an output signal of the inter-field interpolating circuit 14.

The mean filter 15 performs an interpolation based on a weight by use of peripheral pixels adjacent to the current pixel to be interpolated under a control of the correlation detector 16.

That is, the mean filter 15 calculates the mean of peripheral pixel values of all directions obtained at the vicinity of the current pixel while adding a weight and then substitutes the resultant value for the current pixel value. To this end, the mean filter 15 calculates the mean M(a') between the values of upper and lower first pixels vertically adjacent to the current pixel to be interpolated in the current field, the mean M(b') between the values of the lower left-hand and upper right-hand pixels adjacent to the current pixel in one diagonal direction, the mean M(c') between the values of the upper left-hand and lower right-hand pixels adjacent to the current pixel in the other diagonal direction, and the mean M(d') between the values of the upper and lower third pixels vertically adjacent to the current pixel. For the weight, the mean M(T7') of values of peripheral pixels associated with the correlation value T7 is also calculated. Thereafter, the total mean of the calculated mean values M(a'), M(b'), M(c'), M(d') and M(T7') is calculated and then substituted for the current pixel value Y to be interpolated. The above calculations are carried out using the following equations:

$$Y=\mathrm{Mean}[(-M(a')+M(b')+M(c')+M(d')+M(T7'))/5]$$

$$M(a')=(X(i,j-1,t)+X(i,j+1,t))/2$$

$$M(b')=(X(i-1,j-1,t)+X(i+1,j+1,t))/2$$

$$M(c')=(X(i+1,j-1,t)+X(i-1,j+1,t))/2$$

$$M(d')=(X(i,j-3,t)+X(i,j+3,t))/2$$

The field storing circuit 17 comprises two field memories 171 and 172 connected to each other in series. With such a construction, the field storing circuit 17 stores video signals outputted by lines from the multiplexer 12, by frames.

The motion compensating and interpolating circuit 18 serves to perform motion compensation and interpolation using video signals stored in the field storing circuit 17 in accordance with control signals from the slice buffers 7 and 8. That is, the motion compensating and interpolating circuit 18 performs the motion compensation and interpolation where a signal outputted from the format conversion controlling unit 6 via the slice buffer 7 is indicative of the motion-involved condition.

The multiplexer 19 serves to select one video signal among video signals respectively outputted from the intra-field interpolating circuit 13, the inter-field interpolating circuit 14, the mean filter 15, and the motion compensating and interpolating circuit 18 under control of the correlation detector 16 and the slice buffer 7.

That is, the multiplexer 19 selects a video signal outputted from the format conversion controlling unit 6 when the slice buffer 7 outputs a control signal indicative of the stationary condition or representing that the sum of displaced frame differences for every slice is less than its threshold value. When the format conversion controlling unit 6 outputs a control signal indicative of the motion-involved condition via the slice buffer 7, the multiplexer 19 selects a video signal outputted from the motion compensating and interpolating unit 18. The multiplexer 19 also selects a video signal outputted from the mean filter 15 when the correlation detector 16 outputs a control signal representing that the correlation value is less than its threshold value. On the other hand, when the correlation detector 16 outputs a control signal representing that the correlation value is not less than its threshold value, the multiplexer 19 selects a video signal outputted from the intra-field interpolating circuit 13. The selected signal from the multiplexer 19 is then sent to the multiplexer 20.

The multiplexer 20 selects alternatingly the video signal outputted form the multiplexer 12 for every line and the video signal outputted from the multiplexer 19 for every line after interpolation. Finally, the multiplexer 20 sends the alternatingly selected video signals to a monitor not shown.

Operation of the video format conversion apparatus with the above-mentioned arrangement will now be described.

Upon receiving input data Vdi of the interlaced scanning format transmitted from an encoder, the variable length decoding and demultiplexing unit 1 variable length-decodes and demultiplexes the received input data Vdi by macroblocks, thereby causing the input data Vdi to be divided into video signals, quantization coefficients, motion vectors and control parameters. The resultant signal from the variable length decoding and demultiplexing unit 1 is sent to the dequantizing unit 2 which, in turn, dequantizes the received signal. The inverse discrete cosine transforming unit 3 receives a dequantized signal from the dequantizing unit 2 and performs an inverse discrete cosine transform for the received signal, thereby recovering displaced frame difference in accordance with an estimation of video motion.

On the other hand, video signals of the previous field stored in the even field storing circuit 51 and the odd field storing circuit 52 are shifted to be motion-compensated in the motion compensating unit 4, based on motion vectors MV outputted by macroblocks from the variable length decoding and demultiplexing unit 1. The motion-compensated video signals are added to video signals outputted from the inverse discrete cosine transforming unit 3 and then stored in the even field string circuit 51 and the odd field storing circuit 52, respectively.

The motion vectors MV outputted from the variable length decoding and demultiplexing unit 1, the displaced frame differences outputted from the inverse discrete cosine transforming unit 3 and video signals stored in the even field storing circuit and odd field storing circuit 52 are utilized to control various interpolation operations carried out by pixels in the format conversion controlling unit 6 in accordance with the stationary condition, the motion-involved condition, and the scene-changed condition.

That is, the format conversion controlling unit 6 determines whether the difference T1 between the values of reference pixels, positioned at the same position as the current pixel to be interpolated, in the previous and next fields respectively preceding and following the current field including the current pixel is less than its threshold value Th1 (T1<Th1) and whether the difference T2 between the mean of values of the upper and lower first pixels vertically adjacent to the current pixel in the current field and the mean of the reference pixel values in the previous and next fields is less than its threshold value Th2 (T2<Th2). When the differences T1 and T2 are determined to be less than the threshold values Th1 and Th2, respectively, the format conversion controlling unit 6 applies a control signal to the multiplexer 19 via the slice buffer 7 so as to replace or substitute the current pixel value of the current field to be interpolated with the mean value of the reference pixel values in the previous and next fields.

In other words, when the following equations are satisfied, the format conversion controlling unit 6 controls the multiplexer 19 so that the output from the inter-field interpolating circuit 14 is used as the current pixel value of the current field to be interpolated:

$$T1 = |(X(i,j,t-1) - X(i,j,t+1)|$$

$$T2 = |(X(i,j-1,t) + X(i,j+1,t))/2 - (X(i,j-1,t-1) + X(i,j+1,t+1))/2|$$

$$T1 < Th1$$

$$T2 < Th2$$

In this case, the threshold values Th1 and Th2 are values experimentally determined by the observation of the screen condition.

The format conversion controlling unit 6 determines the motion-involved condition using the motion-compensated reference pixel values of the previous and next fields, the reference pixel value of the previous field, and the reference pixel value of the next field, and then applies a control signal to the motion compensating and interpolating circuit 18 and the multiplexer 19 via the slice buffer 7 so as to substitute the current pixel value of the current field to be interpolated with one selected among the mean of the motion-compensated reference pixel values of the previous and next fields, the motion-compensated reference pixel value of the previous field and the motion-compensated reference pixel value of the next field.

That is, the format conversion controlling unit 6 determines whether the difference T3 between the motion-compensated reference pixel values in the previous and next fields is less than its threshold value Th3 (T3<Th3) and whether the difference T4 between the mean of values of the upper and lower first pixels in the current field and the mean of the motion-compensated reference pixel values in the previous and next fields is less than its threshold value Th4 (T4<Th4). When the differences T3 and T4 are less than the threshold values Th3 and Th4, respectively, the format conversion controlling unit 6 applies a control signal to the motion compensating and interpolating circuit 18 and the multiplexer 19 so as to substitute the current pixel value to be interpolated by the mean of the bidirectionally motion-compensated pixel values.

In other words, when the following equations are satisfied, the format conversion controlling unit 6 controls the motion compensating and interpolating circuit 18 to substitute the current pixel value of the current field to be interpolated with the mean of the bidirectionally motion-compensated pixel values and controls the multiplexer 19 to select the output of the motion compensating and interpolating circuit 18 as the final output:

$$T3 = |X(i+v-fx, j+v-fy, t-1) - X(i+v-bx, j+v-by, t+1)|$$

$$T4 = |(X(i, j-1, t) - X(i, j+1, t))/2 - (X(i+v-fx, j+v-fy, t-1) + X(i+v-bx, j+v-by, t+1))/2|$$

T3 < Th3

T4 < Th4 where, v−fx and v−fy represent normal and reverse x-axis motion vectors, respectively, while v−bx and v−by represent normal and reverse y-axis motion vectors.

In this case, the threshold values Th3 and Th4 are values experimentally determined by the observation of the screen condition.

The format conversion controlling unit 6 also determines whether the difference T5 between the mean of values of the upper and lower first pixels in the current field and the mean of the motion-compensated values of the upper and lower first pixels in the previous field is less than its threshold value Th5. When the difference T5 is determined to be less than the threshold value Th5, the format conversion controlling unit 6 applies a control signal to the motion compensating and interpolating circuit 18 and the multiplexer 19 so as to substitute the current pixel value to be interpolated with the motion-compensated reference pixel value in the previous field.

In other words, when the following equations are satisfied, the format conversion controlling unit 6 controls the motion compensating and interpolating circuit 18 to substitute the current pixel value of the current field to be interpolated by the motion-compensated reference pixel value in the previous field and controls the multiplexer 19 to select the output of the motion compensating and interpolating circuit 18 as the final output:

$$T5 = |(X(i, j-1, t) - X(i+v-fx, j+v-fy-1, t-1) + X(i, j+1, t) - X(i+v-fx, j+v-fy+1, t-1))/2|$$

T5 < Th5

In this case, the threshold value Th5 is a value experimentally determined by the observation of the screen condition.

The format conversion controlling unit 6 also determines whether the difference T6 between the mean of value of the upper and lower first pixels in the current field and the mean value of the motion-compensated values of the upper and lower first pixels in the next field is less than its threshold value Th6. When the difference T6 is determined to be less than the threshold value Th6, the format conversion controlling unit 6 applies a control signal to the motion compensating and interpolating circuit 18 and the multiplexer 19 via the slice buffer 7 so as to substitute the current pixel value to be interpolated with the motion-compensated pixel reference value in the next field.

in other words, when the following equations are satisfied, the format conversion controlling unit 6 controls the motion compensating and interpolating unit 18 to substitute the current pixel value of the current field to be interpolated with the motion-compensated reference pixel value in the next field and controls the multiplexer 19 to select the output of the motion compensating and interpolating circuit 18 as the final output:

$$T6 = |(X(i, j-1, t) - X(i+v-bx, j+v-by-1, t+1) + X(i, j+1, t) - X(i+v-bx, j+v-by+1, t+1))/2|$$

T6 < Th6

In this case, the threshold value Th6 is a value experimentally determined by the observation of the screen condition.

Where the format conversion controlling unit 6 has determined the current pixel to be neither the stationary pixel nor the motion pixel, it then determines whether the sum of absolute displaced frame differences in macroblocks for the current slice including the current pixel is less than its threshold value Th7. When the sum of the absolute displaced frame differences is less than the threshold value Th7, the format conversion controlling unit 6 applies a control signal to the multiplexer 19 via the slice buffer 7 so as to substitute the current pixel value in the current field to be interpolated by the mean of reference pixel values in the previous and next fields. The threshold value Th7 is a value experimentally determined by the observation of the screen condition.

That is, the format conversion controlling unit 6 controls the multiplexer 19 so that the output from the inter-field interpolating circuit 14 is used as the current pixel value in the current field to be interpolated.

When the sum of the absolute displaced frame differences is less than the threshold value Th7, the format conversion controlling unit 6 controls the correlation detector 16 through the slice buffer 7 so as to detect a correlation value.

Since the format conversion controlling unit 6 outputs control signals of controlling the interpolating unit 9 respectively for macroblocks, these control signals are collected by slices in the slice buffer 7 and then sequentially applied by lines to the interpolating unit 9 for individual pixels.

In similarly, the motion vectors MV outputted by macroblocks from the variable length decoding and demultiplexing unit 1 are collected by slices in the slice buffer 8 and then sequentially applied by lines to the interpolating unit 9 for individual pixels.

Based on the control signals from the slice buffer 7 and the motion vectors MV from the slice buffer 8, the interpolating unit 9 performs its interpolation operation using video signals stored in the field memories 171 and 172.

The interpolation operation of the interpolating unit 9 will now be described in detail.

Video signals outputted from the motion compensating unit 4 are converted by lines through the slice buffers 10 and 11 so that they can be sequentially outputted for individual pixels.

Video signals of even and odd fields respectively outputted by lines from the slice buffers 10 and 11 are alternatingly selected in the multiplexer 12 so that they can be alternatingly outputted.

Each of video signals sequentially outputted from the multiplexer 12 is subjected to an intra-field interpolation in the intra-field interpolating circuit 13 and then sent to the multiplexer 19.

That is, the video signals outputted by lines from the multiplexer 12 are sequentially applied to the line delay circuit 131 and then to the line delay circuit 132. A video signal outputted from the line delay 132 is applied to the adder 1331 of the mean calculating circuit 133 which also receives a video signal from the multiplexer 12. The adder 1331 calculates the sum of the received video signals and then sends the resultant signal to the ½ multiplier 1332 which, in turn, calculates the mean value of the video signals. The ½ multiplier 1332 sends the mean value to the multiplexer 19.

In this case, the pixels calculated in the mean calculating circuit 133 are pixels in an even field or an odd field, namely, pixels in the same field as the current pixel to be interpolated. For calculating the mean value of such pixels positioned at the same horizontal position as the current pixel in upper and lower lines arranged adjacent to the current line including the current pixel, delay and processing for every line are made.

The video signal outputted from the multiplexer 12 is also subjected to an inter-field interpolation in the inter-field interpolating circuit 14 and then sent to the multiplexer 19.

That is, the video signal is applied to the adder 1421 of the mean calculating circuit 142 which also receives a video signal from the field memory 172. The adder 1421 calculates the sum of the received video signals and then sends the resultant signal to the ½ multiplier 1422 which, in turn, calculates the mean value of the video signals. The ½ multiplier 1422 sends the mean value to the multiplexer 19.

In this case, the pixels calculated in the mean calculating circuit 142 are pixels, positioned at the same horizontal and vertical position as the current pixel to be interpolated, in the previous and next frames respectively preceding and following the current frame including the current pixel. For calculating the mean value of such pixels, delay and processing for every frame are made. The video signal outputted from the multiplexer 12 is also applied to the correlation detector 16 to be used for a detection of a correlation value T7. That is, when the correlation detector 16 receives a control signal for executing the correlation detection from the format conversion controlling unit 6 via the slice buffer 7, calculations using the following equations are made for video signals outputted by lines from the multiplexer 12 in order to detect a correlation of the current pixel with peripheral pixels:

$$a=(X(i,j-1,t)+X(i,j+1,t)/|X(i,j-1,t)-X(i,j+1,t)|$$

$$b=(X(i-1,j-1,t)+X(i+1,j+1,t)/|X-(i-1,j-1,t)+X(i+1,j+1,t)|$$

$$c=(X(i+1,j-1,t)+X(i-1,j+1,t)/|X-(i+1,j-1,t)+X(i-1,j+1,t)|$$

$$d=(X(i,j-3,t)+X(i,j+3,t)/|X(i,j-3,t)+X(i,j+3,t)|$$

$$T7=MIN(a,b,c,d)$$

By referring to the above equations, the correlation detector 16 calculates the ratio a of the sum of values of the upper and lower first pixels vertically adjacent to the current pixel to be interpolated to the difference therebetween, the ratio b of the sum of values of pixels adjacent to the current pixel in one diagonal direction to the difference therebetween, the ratio c of the sum of values of pixels adjacent to the current pixel in the other diagonal direction to the difference therebetween, and the ratio d of the sum of values of upper and lower third pixels adjacent to the difference therebetween. Thereafter, the correlation detector 16 determines the minimum one of the calculated ratios a, b, c and d as the correlation value T7.

The correlation detector 16 then compares the determined correlation value T7 with a threshold value Th8. When the correlation value T7 is less than the threshold value Th8, the correlation detector 16 operates to activate the mean filter 15 so that the multiplexer 19 selects an output signal of the mean filter 15. When the correlation value T7 is not less than the threshold value Th8, the correction detector 16 controls the multiplexer 19 to select an output signal of the inter-field interpolating circuit 14 performing the inter-field interpolation.

The threshold value Th8 is a value experimentally determined by the observation of the screen condition.

The video signal from the multiplexer 12 is also applied to the mean filter 15 which, in turn, performs a mean filtering for the received signal under a control of the correlation detector 16. The resultant signal from the mean filter 15 is sent to the multiplexer 19.

That is, when the mean filter 15 receives a control signal for executing the mean filtering from the correlation detector 16, an interpolation based on a weight is performed using peripheral pixel values received from the multiplexer 12 in accordance with the following equation:

$$Y=Mean[(-M(a')+M(b')+M(c')+M(d')+M(T7'))/5]$$

where, $$M(a')=(X(i,j-1,t)+X(i,j+1,t))/2$$

$$M(b')=(X(i-1,j-1,t)+X(i+1,j+1,t))/2$$

$$M(c')=(X(i+1,j-1,t)+X(i-1,j+1,t))/2$$

$$M(d')=(X(i,j-3,t)+X(i,j+3,t))/2$$

By referring to the above equation, the mean filter 15 calculates the mean M(a') between the values of upper and lower first pixels in the current field, the mean M(b') between the values of the lower left-hand and upper right-hand pixels adjacent to the current pixel in one diagonal direction, the mean M(c') between the values of the upper left-hand and lower right-hand pixels adjacent to the current pixel in the other diagonal direction, the mean M(d') between the values of the upper and lower third pixels vertically adjacent to the current pixel, and the mean M(T7') of peripheral pixel values associated with the correlation T7. Thereafter, the mean filter 15 calculates the total mean of the calculated mean values M(a'), M(b'), M(c'), M(d') and M(T7') and then substitutes it for the current pixel value Y to be interpolated.

The reason why the addition of the mean (M(T7') of peripheral pixel values associated with the correlation T7 is implemented in derivation of the total mean is to take the weight into consideration.

The video signals outputted by lines from the multiplexer 12 are stored by frames in the frame memory 171 of the field storing circuit 17. The frame memory 171 sends the stored video signal to the frame memory 172 so as to receive a video signal of the next frame. The video signal stored in the frame memory 172 is used for the motion compensation and interpolation in the motion compensating and interpolating circuit 18.

On the other hand, when the difference T3 between the motion-compensated reference pixel values in the previous and next fields and the difference T4 between the mean value of values of the upper and lower first pixels in the current field and the mean of the motion-compensated reference pixel values in the previous and next fields are less than their threshold value Th3 and Th4, respectively, the format conversion controlling unit 6 controls the motion compensating and interpolating circuit 18 through the slice buffer 7 to perform the bidirectional motion compensation. For the bidirectional motion compensation, the current pixel value Y to be interpolated is substituted by the mean of the motion-compensated reference pixel values in the previous and next fields, as expressed by the following equation:

$$Y=|(X(i+v-fx,j+v-fy,t-1)+X(i+v-bx,j+v-by,t+1))/2|$$

When the difference T5 between the mean of values of the upper and lower first pixels in the current field and the mean of the motion-compensated values of the upper and lower first pixels in the previous field is less than its threshold value Th5, the format conversion controlling unit 6 controls the motion compensating and interpolating circuit 18 through the slice buffer 7 to perform the normal-directional motion compensation. For the normal-directional motion compensation, the current pixel value Y to be interpolated is substituted by the motion-compensated reference pixel value in the previous field, as expressed by the following equation:

$$Y=X(i+v-fx,j+v-fy,t-1)$$

When the difference T6 between the mean of values of the upper and lower first pixels in the current pixel and the mean of the motion-compensated values of the upper and lower first pixels in the next field is less than its threshold value Th6, the format conversion controlling unit 6 controls the motion compensating and interpolating circuit 18 through the slice buffer 7 to perform the reverse-directional motion compensation. For the reverse-directional motion compensation, the current pixel value Y to be interpolated is substituted by the motion-compensated reference pixel value in the next field, as expressed by the following equation:

$$Y=X(i+v-bx,j+v-by,t+1)$$

The interpolated pixel values from the intra-field interpolating circuit 13, the inter-field interpolating circuit 14, and the mean filter 15 are selectively sent from the multiplexer 19 to the multiplexer 20 under controls of the correlation detector 16 and the format conversion controlling unit 6.

That is, when the format conversion controlling unit 6 detects the stationary condition, the multiplexer 19 selects the output of the inter-field interpolating circuit 14. The multiplexer 19 also selects the output of the motion compensating and interpolating circuit 18 when the format conversion controlling unit 6 detects the motion-involved condition. The multiplexer 19 also selects one of: the output of the inter-field interpolating circuit 14 when the format conversion controlling unit 6 determines the sum of absolute displaced frame differences to be less than the threshold value Th7, the output of the mean filter 15 when the correlation detector 16 determines the correlation value T7 to be less than the threshold value Th8, and the output of the intra-field interpolating circuit 13 when the correlation detector 16 determines the correlation value T7 not to be less than the threshold value Th8. The selected signal is sent to the multiplexer 20.

An interpolated video signal for every line outputted from the multiplexer 19 and a video signal for every line outputted from the multiplexer 12 are alternatingly selected by lines in the multiplexer 20 and then finally sent to a monitor not shown.

Figure 3:
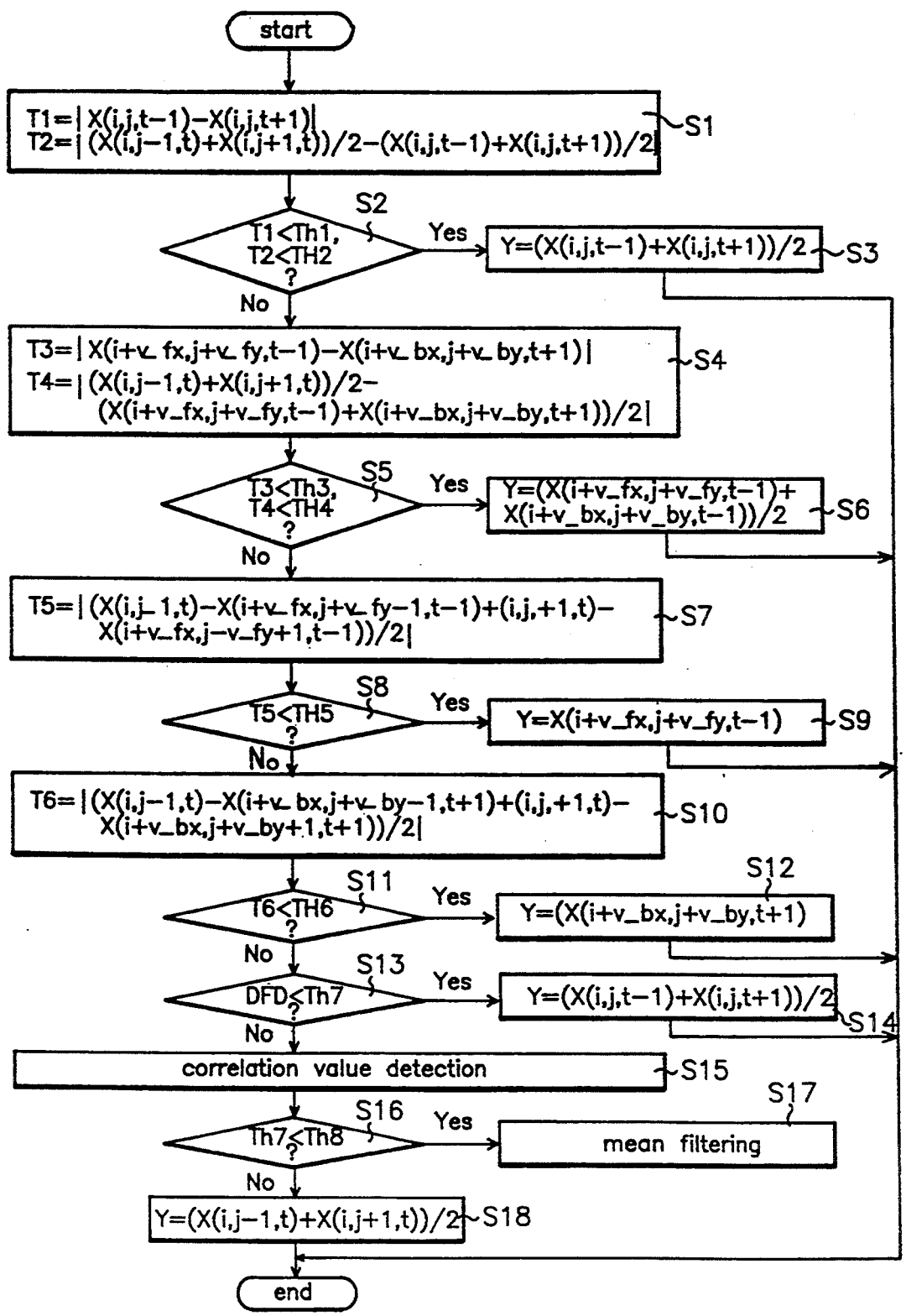
FIG. 3 is a flow chart illustrating a video format conversion apparatus in accordance with the present invention.

Now, the video format conversion carried out in the format conversion controlling unit 6 in accordance with the present invention will be described in conjunction with FIG. 3.

First, a determination is made about whether the current pixel to be interpolated is a stationary pixel. When the current pixel is a stationary pixel, an interpolation is executed wherein the value of the current pixel is substituted with the mean of the reference pixel values in the previous and next fields. These stationary pixel determination and interpolation are carried out at steps S1 to S3.

That is, the difference T1 between the reference pixel values in the previous and next fields respectively preceding and following the current field including the current pixel is calculated at the step S1. The difference T2 between the mean value of values of the upper and lower first pixels in the current field and the mean of the reference pixel values in the previous and next fields is also calculated. These calculations are achieved using the following equations:

$$T1=|(X(i,j,t-1)-X(i,j,t+1)|$$

$$T2=|(X(i,j-1,t)+X(i,j+1,t))/2-(X(i,j-1,t-1)+X(i,j,t+1))/2|$$

After the calculations, determinations are made about whether the calculated differences T1 and T2 are less than threshold values Th1 and Th2, respectively, at the step S2. When the differences T1 and T2 are determined to be less than the threshold values Th1 and Th2, respectively, the stationary pixel interpolation is executed at the step S3. That is, the pixel value Y of the current pixel to be interpolated is substituted by the mean of the reference pixel values in the previous and next fields using the following equation at the step S3:

$$Y=(X(i,j,t-1)+X(i,j,t+1))/2$$

Alternatively, the reference pixel value of the previous or next field may be used in place of the mean reference pixel values of the previous and next fields when the current pixel is the stationary pixel. After executing the step S3, the video format conversion procedure is completed.

When both the differences T1 and T2 have not been determined to be less than their threshold values Th1 and Th2, a determination is made about whether the current pixel is a motion pixel capable of being motion-compensated. When the current pixel is such a motion pixel, it is interpolated through a motion compensation. These motion pixel determination and interpolation are executed at steps S4 to S12.

The interpolation for the current pixel using the motion-compensated reference pixel values in the previous and next fields can be achieved by selectively executing a bidirectional motion compensation procedure. The value of the current pixel to be interpolated is substituted with the mean of the motion-compensated reference pixel values of the previous and next fields in accordance with the motion-compensated reference pixel values of the previous and next fields, a normal-directional motion compensation procedure, in which the value of the current pixel is substituted with the motion-compensated reference pixel value in the previous field in accordance with the motion-compensated reference pixel value in the previous field, and a reverse-directional motion compensation procedure, in which the value of the current pixel is substituted with the motion-compensated reference pixel value in the next field in accordance with the motion-compensated reference pixel value in the next field.

That is, the step S4 is executed to calculate the difference T3 between the motion-compensated reference pixel values in the previous and next fields and the difference T4 between the mean value of values of the upper and lower first pixels in the current field and the mean of the motion-compensated reference pixel values in the previous and next fields. The calculations are achieved using the following equations:

$$T3 = |X(i+v-fx, j+v-fy, t-1) - X(i+v-bx, j+v-by, t+1)|$$

$$T4 = |(X(i, j-1, t) - X(i, j+1, t))/2 - (X(i+v-fx, j+v-fy, t-1) + X(i+v-bx, j+v-by, t+1))/2|$$

After completing the above calculations, the bidirectional motion compensation determining step S5 is executed. At the step S5, a determination is made whether the differences T3 and T4 are less than their threshold values Th3 and Th4, respectively.

When the differences T3 and T4 are determined to be less than the threshold values Th3 and Th4, respectively, an interpolation using the bidirectional motion compensation is executed at the step S6. That is, the pixel value Y of the current pixel to be interpolated is substituted by the mean of the motion-compensated reference pixel values in the previous and next fields using the following equation at the step S6:

$$Y = (X(i+v-fx, j+v-fy, t-1) + X(i+v-bx, j+v-by, t+1))/2$$

After executing the step S6, the video format conversion procedure is completed.

When both the differences T3 and T4 have not been determined to be less than their threshold values Th3 and Th4 at the bidirectional motion compensation determining step S5, the normal-directional motion compensation is executed at the steps S7 to S9.

That is, the step S7 is executed to calculate the difference T5 between the mean of values of the upper and lower first pixels in the current field and the mean of the motion-compensated values of the upper and lower first pixels in the previous field. The calculation is achieved using the following equation:

$$T5 = |(X(i, j-1, t) - X(i+v-fx, j+v-fy-1, t-1) + X(i, j+1, t) - X(i+v-fx, j+v-fy+1, t-1))/2|$$

After completing the above calculation, the normal-directional motion compensation determining step S8 is executed. At the step S8, a determination is made about whether the differences T5 is less than its threshold value Th5.

When the difference T5 is determined to be less than the threshold value Th5, an interpolation using the normal-directional motion compensation is executed at the step S9. That is, the current pixel value Y is substituted with the motion-compensated value of the reference pixel in the previous field using the following equation at the step S9:

$$Y = X(i+v-fx, j+v-fy, t-1)$$

After executing the step S9, the video format conversion procedure is completed.

When the difference T5 has not been determined to be less than its threshold value Th5 at the normal-directional motion compensation determining step S8, the reverse-directional motion compensation is executed at the steps S10 to S12.

That is, the step S10 is executed to calculate the difference T6 between the mean value of values of the upper and lower first pixels in the current field and the mean of the motion-compensated values of the upper and lower first pixels in the next field. The calculation is achieved using the following equation:

$$T6 = |(X(i, j-1, t) - X(i+v-bx, j+v-by-1, t+1) + X(i, j+1, t) - X(i+v-bx, j+v-by+1, t+1))/2|$$

After completing the above calculation, the reverse-directional motion compensation determining step S11 is executed. At the step S11, a determination is made whether the differences T6 is less than its threshold value Th6.

When the difference T6 is determined to be less than the threshold value Th6, an interpolation using the reverse-directional motion compensation is executed at the step S12. That is, the current pixel value Y is substituted with the motion-compensated value of the reference pixel in the next field using the following equation at the step S12:

$$Y = X(i+v-bx, j+v-by, t+1)$$

After executing the step S12, the video format conversion procedure is completed.

When the difference T6 has not been determined to be less than its threshold value Th6 at the reverse-directional motion compensation determining step S11, the procedure proceeds to a displaced frame difference determining step.

That is, where the current pixel is neither stationary pixel nor a motion pixel, the displaced frame difference determining step S13 is executed. At the step S13, a determination is made whether the sum of the absolute values of displaced frame differences in macroblocks for the current slice including the current pixel is less than its threshold value Th7.

When the sum of the absolute values of displaced frame differences is determined to be less than its threshold value Th7, an inter-field interpolation is executed at the step S14. That is, the current pixel value Y is substituted by the mean of the reference pixel values in the previous and next fields using the following equation at the step S14:

$$Y = (X(i, j, t-1) + X(i, j, t+1))/2$$

After executing the step S14, the video format conversion procedure is completed.

When the sum of the absolute values of displaced frame differences has not been determined to be less than its threshold value Th7 at the displaced frame difference determining step S13, an intra-field interpolation for interpolating the current pixel using intra-field pixel values is executed at steps S15 to S18.

That is, the step 15 is executed to detect a correlation value T7 indicative of the correlation of the current pixel with peripheral pixels. Thereafter, a correlation determination is made to check whether the detected correlation value T7 is less than its threshold value Th8.

At the step S15, the correlation value T7 is detected by calculating the ratio a of the sum of values of upper and lower first pixels in the current field to the absolute difference therebetween, the ratio b of the sum of values of pixels adjacent to the current pixel in one diagonal direction to the absolute difference therebetween, and the ratio c of the sum of values of pixels adjacent to the current pixel in the other diagonal direction to the absolute difference therebetween, and the ratio d of the sum of values of upper and lower third pixels adjacent to the current pixel to the absolute difference therebetween, and determining the minimum value among the calculated ratios a, b, c and d as the correlation value T7 using the following equations:

$$a=(X(i,j-1,t)+X(i,j+1,t)/|X(i,j-1,t)-X(i,j+1,t)|$$

$$b=(X(i-1,j-1,t)+X(i+1,j+1,t)/|X(i-1,j-1,t)+X(i+1,j+1,t)|$$

$$c=(X(i+1,j-1,t)+X(i-1,j+1,t)/|X(i+1,j-1,t)+X(i-1,j+1,t)|$$

$$d=(X(i,j-3,t)+X(i,j+3,t)/|X(i,j-3,t)+X(i,j+3,t)|$$

$$T7=MIN(a,b,c,d)$$

After determining the correlation value T7, the correlation determination is made at the step S16 to check whether the correlation value T7 is less than its threshold value Th8. When the correlation value T7 is less than its threshold value Th8, a mean filtering step for achieving an interpolation using the peripheral pixel values is executed at the step 17o Thereafter, the video format conversion procedure is completed.

The mean filtering procedure at the step S17 is carried out by calculating the mean M(a') between the values of upper and lower first pixels in the current field, the mean M(b') between the values of the lower left-hand and upper right-hand pixels adjacent to the current pixel in one diagonal direction, the mean M(c') between the values of the upper left-hand and lower right-hand pixels adjacent to the current pixel in the other diagonal direction, and the mean M(d') between the values of the upper and lower third pixels vertically adjacent to the current pixel. The mean M(T7') of values of peripheral pixels associated with the correlation value T7 is also calculated, Thereafter, the total mean of the calculated mean values M(a'), M(b'), M(c'), M(d') and M(T7') is calculated and then substituted for the current pixel value Y to be interpolated. The above calculations are carried out using the following equations:

$$Y=Mean[(M(a')+M(b')+M(c')+M(d')+M(T7'))/5]$$

$$M(a')=(X(i,j-1,t)+X(i,j+1,t))/2$$

$$M(b')=(X(i-1,j-1,t)+X(i+1,j+1,t))/2$$

$$M(c')=(X(i+1,j-1,t)+X(i-1,j+1,t))/2$$

$$M(d')=(X(i,j-3,t)+X(i,j+3,t))/2$$

When the correlation value T7 has not been determined to be less than its threshold value Th8 at the step 16, an interpolation using an intra-field line averaging is carried out at a step S18. Thereafter, the video format conversion procedure is completed.

That is, the current pixel value Y to be interpolated is substituted by the mean of the pixel values of the upper and lower first pixels in the same field using the following equation:

$$Y=(X(i,j-1,t)+X(i,j+1,t))/2$$

As apparent from the above description, the interpolation is implemented for every pixel in accordance with the present invention. Accordingly, it is possible to achieve an accurate interpolation even when both a stationary pixel and a motion-involved pixel are included in a macroblock. Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A video format conversion apparatus comprising:
   motion compensating means for performing a motion compensation using a variable length-decoded and demultiplexed signal and a dequantized and inverse discrete cosine transformed signal, the motion compensating means generating a video signal;
   field storing means for storing the video signal from the motion compensating means and sending the stored video signal to the motion compensating means;
   format conversion controlling means for generating control signals outputted by macroblocks to control a format conversion using the variable length-decoded and demultiplexed signal, the dequantized and inverse discrete cosine transformed signal, and the video signal stored in the field storing means;
   first slice buffer means for receiving the control signals by macroblocks from the format conversion controlling means and for outputting corresponding individual pixels;
   second slice buffer means for receiving the variable length-decoded and demultiplexed signal for each macroblock and for outputting a corresponding individual pixel;
   interpolating means for performing an interpolation using the video signal from the motion compensating means in accordance with output signals from the first and second slice buffer means.

2. A video format conversion apparatus in accordance with claim 1, wherein the field storing means comprises:
   even field storing means for storing even field video signals sequentially outputted from the motion compensating means; and
   odd field storing means for storing odd field video signals sequentially outputted from the motion compensation means.

3. A video format conversion apparatus in accordance with claim 1, wherein the interpolating means comprises:

third and fourth slice buffer means converting an even field video signal and an odd field video signal outputted from the field storing means into video signals for individual lines, respectively;

a first multiplexer for multiplexing video signals from the third and fourth slice buffer means;

intra-field interpolating means for replacing the value of a current pixel to be interpolated with the mean value of the values of upper and lower adjacent pixels in the same field as the current pixel in accordance with a video signal from the first multiplexer;

inter-field interpolating means for replacing the value of the current pixel with the mean value of the values of reference pixels, positioned at the same position as the current pixel, respectively in a previous field preceding a current field including the current pixel and a next field following the current field in accordance with the video signal from the first multiplexer;

correlation detecting means for detecting a correlation of the current pixel with peripheral pixels in the same field as the current pixel in accordance with the video signal from the first multiplexer in accordance with the output signal from the first slice buffer means;

a mean filter for performing an interpolation for the current pixel using the values of the peripheral pixels under a control of the correlation detecting means;

field memory means for storing video signals sequentially outputted from the first multiplexer by frames;

motion compensating and interpolating means for performing a motion compensation and an interpolation using the video signals stored in the field memory means in accordance with the output signal from the first slice buffer means and the output signal from the second slice buffer means;

a second multiplexer for selectively outputting one of interpolated video signals from the intra-field interpolating means, the inter-field interpolating means, the mean filter, and the motion compensating and interpolating means under control of the correlation detecting means and the first slice buffer means.

4. A video format conversion apparatus in accordance with claim 3, wherein the field memory means comprises a pair of field memories connected to each other in series.

5. A video format conversion apparatus in accordance with claim 3, wherein the intra-field interpolating means comprises:

first line delay means for storing the video signals sequentially outputted from the first multiplexer by lines;

second line delay means for storing video signals sequentially outputted from the first line delay means by lines; and mean calculating means for calculating the mean value of video signals respectively outputted from the first multiplexer and the second line delay means.

6. A video format conversion apparatus in accordance with claim 3, wherein the inter-field interpolating means comprises mean calculating means for calculating the mean value of video signals respectively outputted from the first multiplexer and the field memory means.

7. A video format conversion apparatus in accordance with claim 5, wherein the mean calculating means comprises:

an adder for adding a signal value outputted from the second line delay means to a signal value outputted from the first multiplexer; and an $\frac{1}{2}$ multiplier for multiplying a signal value outputted from the adder by $\frac{1}{2}$.

8. A video format conversion apparatus in accordance with claim 6, wherein the mean calculating means comprises:

an adder for adding a signal value outputted from the field memory means to a signal value outputted from the first multiplexer; and an $\frac{1}{2}$ multiplier for multiplying a signal value outputted from the adder by $\frac{1}{2}$.

9. A video format conversion method comprising:

determining whether a current pixel to be interpolated is a stationary pixel, and replacing the value of the current pixel with the mean value of the values of reference pixels, positioned at the same position as the current pixel, respectively in a previous field preceding a current field including the current pixel and a next field following the current field when the current pixel is stationary;

determining whether the current pixel is a motion-involved pixel, and interpolating the current pixel through a motion compensation when the current pixel is motion-involved;

determining whether a displaced frame difference is less than a predetermined threshold value when the current pixel is neither stationary nor motion-involved;

an inter-field interpolation step replacing the current pixel value with the mean value of the reference pixel values in the previous and next fields when the displaced frame difference is less than the predetermined threshold value; and an intra-field interpolation step of replacing the current pixel value with an intra-field pixel value when the displaced frame difference is not less than the predetermined threshold value;

wherein the step of motion-involved condition determining and interpolating comprises:

a bidirectional motion compensation step of replacing the value of the current pixel with the mean of the motion-compensated reference pixel values of the previous and next fields in accordance with the motion-compensated reference pixel values of the previous and next fields;

a normal-directional motion compensation step of replacing the value of the current pixel with the motion-compensated reference pixel value in the previous field in accordance with the motion-compensated reference pixel value in the previous field; and a reverse-directional motion compensation step of replacing the value of the current pixel with the mean of the motion-compensated reference pixel value in the next field in accordance with the motion-compensated reference pixel value in the next field.

10. A video format conversion method, comprising:

determining whether a current pixel to be interpolated is a stationary pixel, and, replacing the value of the current pixel with the mean value of the values of reference pixels, positioned at the same position as the current pixel, respectively in a previous field preceding a current field including the current pixel and a next field following the current field when the current pixel is stationary;

determining whether the current pixel is a motion-involved pixel, and interpolating the current pixel through a motion compensation when the current pixel is motion-involved;

determining whether a displaced frame difference is less than a predetermined threshold value when the current pixel is neither stationary nor motion-involved;

an inter-field interpolation step of replacing the current pixel value with the mean value of the reference pixel values in the previous and next fields when the displaced frame difference is less than the predetermined threshold value; and an intra-field interpolation step of replacing the current pixel value with an intra-field pixel value when the displaced frame difference is not less than the predetermined threshold value;

wherein the intra-field interpolation step comprises:
calculating a correlation value indicative of a correlation of the current pixel with peripheral pixels and determining whether the calculated correlation value is less than a predetermined threshold value;

a mean filtering step of interpolating the current pixel by use of the peripheral pixels when the correlation value is less than the threshold value; and an intra-field line mean interpolation step of interpolating the current pixel through an intra-field line averaging.

11. A video format conversion method in accordance with claim 9, wherein the bidirectional motion compensation step comprises:
calculating a first difference between the motion-compensated reference pixel values in the previous and next fields and a second difference between the mean of values of the upper and lower first pixels in the current field and the mean of the motion-compensated reference pixel values in the previous and next fields;

a bidirectional motion compensation determination step of determining whether the first and second differences are less than predetermined threshold value, respectively;

a bidirectionally motion-compensating interpolation step of replacing the current pixel value with the mean of the motion-compensated reference pixel values in the previous and next fields when the first and second differences are less than the threshold values, respectively; and proceeding to the normal-directional motion compensation step when both the first and second differences are not less than the threshold values.

12. A video format conversion method in accordance with claim 9, wherein the normal-directional motion compensation step comprises:
a normal-directional motion compensation determination step of calculating the difference between the mean of values of the upper and lower first pixels in the current field and the mean value of the motion-compensated values of the upper and lower first pixels in the previous field and determining whether the difference is less than a predetermined threshold value;

a normal-directionally compensating interpolation step of replacing the current pixel value with the motion-compensated reference pixel value in the previous field when the difference is less than the threshold value; and proceeding to the reverse-directional motion compensation step when the difference is not less than the threshold value.

13. A video format conversion method in accordance with claim 9, wherein the reverse-directional motion compensation step comprises:
a reverse-directional motion compensation determination step of calculating the difference between the mean value of values of the upper and lower first pixels in the current field and the mean value of the motion-compensated values of the upper and lower first pixels in the next field and determining whether the difference is less than a predetermined threshold value;

a reverse-directionally compensating interpolation step of replacing the current pixel value with the motion-compensated reference pixel value in the next field when the difference is less than the threshold value; and proceeding to the displaced frame difference determination step when the difference is not less than the threshold value.

14. A video format conversion method in accordance with claim 10, wherein the correlation determination step comprises the steps of:
calculating the ratio of the sum of the values of upper and lower first pixels in the current field to the absolute difference therebetween;

calculating the ratio of the sum of the values of upper right-hand and lower left-hand first pixels adjacent to the current pixel in one diagonal direction to the absolute difference therebetween;

calculating the ratio of the sum of the values of upper left-hand and lower right-hand first pixels adjacent to the current pixel in the other diagonal direction to the absolute difference therebetween;

calculating the ratio of the sum of the values of upper and lower third pixels vertically adjacent to the current pixel to the absolute difference therebetween; and determining the minimum value among all the calculated ratios as a correlation value; and determining whether the determined correlation value is less than a predetermined threshold value.

15. A video format conversion method in accordance with claim 10, wherein the median filtering step comprises the steps of:
calculating the mean between the values of upper and lower first pixels in the current field;

calculating the mean between the values of upper right-hand and lower left-hand first pixels adjacent to the current pixel in one diagonal direction;

calculating the mean between the values of upper left-hand and lower right-hand first pixels adjacent to the current pixel in the other diagonal direction;

calculating the mean between the values of upper and lower third pixels vertically adjacent to the current pixel;

calculating the mean of values of peripheral pixels associated with the correlation value;

calculating the total mean of all the calculated mean values and substituting the current pixel value by the calculated total mean.

* * * * *